US005833892A

United States Patent [19]
Gurav et al.

[11] Patent Number: 5,833,892
[45] Date of Patent: Nov. 10, 1998

[54] FORMATION OF TIO₂ PIGMENT BY SPRAY CALCINATION

[75] Inventors: Abhijit S. Gurav; Toivo T. Kodas, both of Albuquerque, N. Mex.; Bruce M. Anderson, Savannah, Ga.

[73] Assignee: Kemira Pigments, Inc., Savannah, Ga.

[21] Appl. No.: 680,911

[22] Filed: Jul. 12, 1996

[51] Int. Cl.⁶ .......................... C01B 13/20; C01B 13/18; C09B 1/36
[52] U.S. Cl. .......................... 264/13; 106/403; 106/404; 106/430; 106/436; 106/438; 106/441; 106/442; 106/449; 423/610; 423/611; 423/615
[58] Field of Search .......................... 264/13; 423/610, 423/611, 615; 106/436, 403, 404, 430, 438, 441, 442, 449

[56] References Cited

U.S. PATENT DOCUMENTS

| | | | |
|---|---|---|---|
| 3,956,006 | 5/1976 | Winter | 423/610 |
| 4,999,182 | 3/1991 | Baumard et al. | |
| 5,009,879 | 4/1991 | De Cleyn | 423/610 |
| 5,061,682 | 10/1991 | Aksay et al. | |
| 5,358,695 | 10/1994 | Helble | 423/592 |
| 5,447,708 | 9/1995 | Helble | 423/610 |

OTHER PUBLICATIONS

Ceramic Powder Science, vol. III, pp. 99–106.
Ceramic International, vol. 8, No. 1 (1982) pp. 17–21.
Funtai Oyobi Funmatur Yakin, vol. 24 (1977), pp. 43–47.
Yogyo–Kyokai–Shi 91 [7] 1985.
Yogyo–Kyokai–Shi 91 [7] 1983, pp. 344–346.
Yogyo–Kyokai–Shi 91 [2] 1983, pp. 81–86.
Funtai Oyobi Funmatsu Yakin, vol. 18 (1972) 280–283.
Journal of Material Science, 20 (1985) 1823–1827.
Report of the Research Laboratory of Engineering Materials, Tokyo Institute of Technology, No. 9 (1984) pp. 66–73.
Nippon Kagai Kaishi vol. 6 (1984) pp. 851–855.
Advances in Ceramics, vol. 21 (1987), pp. 99–108.
J. Appl. Phys. 67 (9) pp. 4367–4369 (1990).
Journal of Alloys and Compounds, 187 (1992) pp. 193–205.

*Primary Examiner*—James Derrington
*Attorney, Agent, or Firm*—Gudrun E. Huckett; Robert W. Becker & Associates

[57] ABSTRACT

In a method of producing TiO₂ pigment particles a $TiO_aX_b(OH)_c$-based precursor is suspended in a liquid with or without fuel additives. The suspension is then sprayed to form droplets. The droplets are transported into a flow reactor with a carrier gas. The droplets are decomposed in the flow reactor at high temperatures to form TiO₂ pigment particles which are collected downstream of the flow reactor. In a preferred embodiment, a colloidal suspension of an insoluble $TiO(SO_4)_b(OH)_c$ precipitate with suitable fuel additives was spray-calcined at 900° to 1200° C. to produce pigment-quality TiO₂. The primary particle size of the TiO₂ pigment particles is between 150–250 nm and the particles are minimally aggregated.

14 Claims, 1 Drawing Sheet

System for the Formation of Pigment-Grade Titania Via Spray Calcination

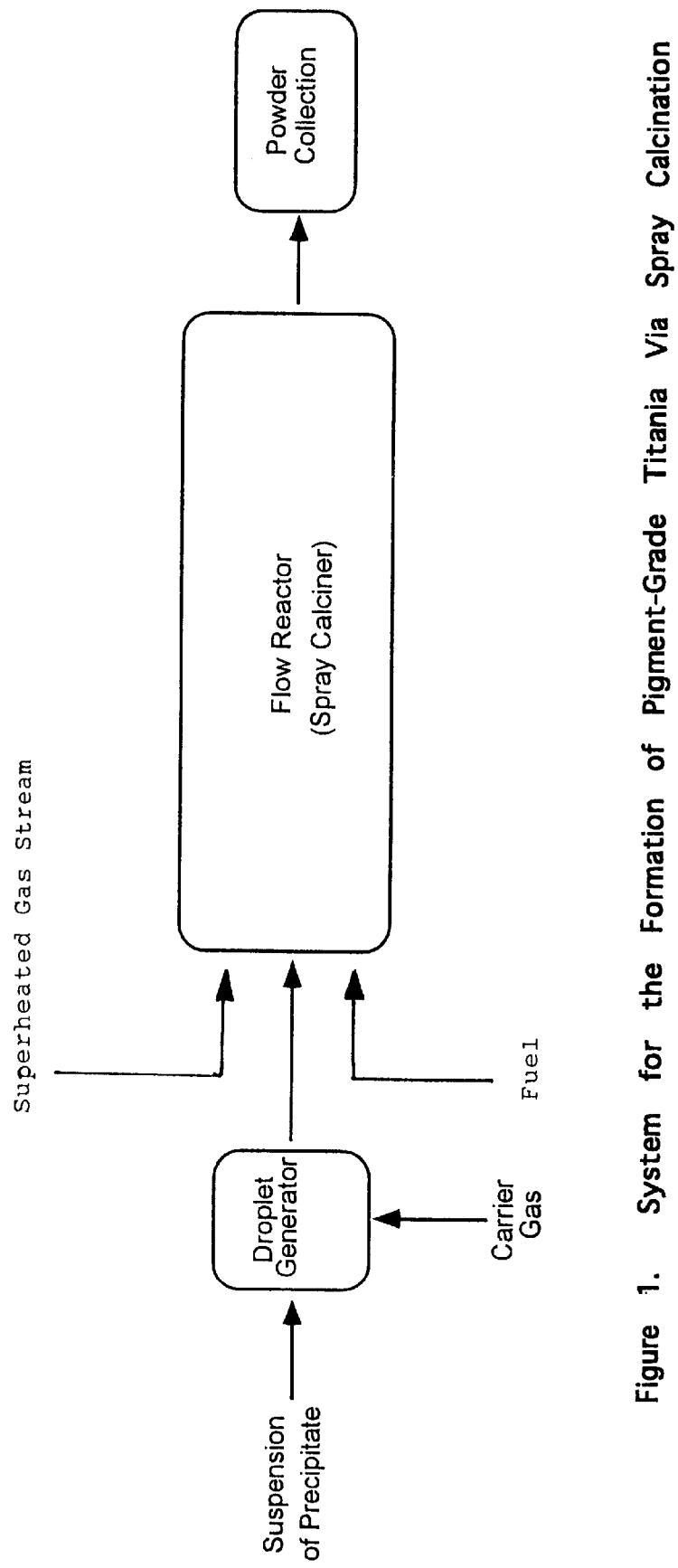
Figure 1. System for the Formation of Pigment-Grade Titania Via Spray Calcination

FORMATION OF TIO₂ PIGMENT BY SPRAY CALCINATION

FIELD OF THE INVENTION

The present invention relates to a process of manufacturing $TiO_2$ (titania) pigment particles by spraying titanium precipitates suspended in liquids into a hot reactor.

DISCUSSION OF PRIOR ART

The conventional methods for making $TiO_2$ (titania) pigment particles include the chloride process based on the gas-phase oxidation of $TiCl_4$ and the sulfate process based on the calcination of titanium hydrolysate precipitate $TiO_a(SO_4)_b(OH)_c$. The hydrolysate, also referred to simply as $TiOSO_4$, is a mixture the composition of which is highly dependent upon processing conditions. This is, however, immaterial with respect to the formation of $TiO_2$.

The commercially practiced sulfate process uses a rotary high temperature calciner receiving a feed of the titanium hydrolysate precipitate at one end and preheated air through the other. The precipitate decomposes at high temperatures in the calciner (~1000° C.) resulting in the formation of $TiO_2$. This approach is disadvantageous because it requires high inputs of energy, expensive and complicated equipment, long processing times, and subsequent milling of the calcined product. Furthermore, the product is still highly aggregated even after milling.

Similar to the reaction of $TiCl_4$, titania can also be synthesized by the gas-phase reaction or liquid-phase hydrolysis and condensation of titanium alkoxides (e.g., titanium isopropoxide).

Various spray processes are known in the art for the production of powders.

U.S. Pat. No. 5,061,682 (Aksay et al.) discloses the generation of ceramic powder material from metal nitrates in a spray process by using an oxidation-reduction reaction. Carbohydrates are used as fuels, and typically metal nitrates in aqueous solution are used as the oxidizing agent. The reduction of nitrate provides the required amount of oxygen for the combustion (oxidation) of the carbohydrate fuel which delivers the required amount of thermal energy for the formation of the ceramic material. Only dissolved metal nitrate compounds are used as precursor materials for the ceramics.

A similar process is disclosed in Ceramic Powder Science, Vol. III, pp. 99–106, wherein the use of urea, glycine and sucrose is suggested in conjunction with the metal nitrates.

U.S. Pat. No. 4,999,182 (Baumard et al.) refers to a process for the generation of stabilized zirconia powders from aerosol droplets of a mixed precursor solution containing at least one inorganic zirconium salt and at least one inorganic salt of a zirconia-stabilizing element. The aerosol droplets are heated and thereafter calcined.

The addition of ethanol and glycerin to aqueous precursor solutions of respective metal nitrates to study the morphology, crystallinity and sinterability of $Mg_2AlO_4$ and ZnO powders made via spray pyrolysis is disclosed in various references (Ceramics International, Vol. 8, No. 1 (1982) pp. 17–21; Funtai Oyobi Funmatu Yakin, Vol. 24 (1977), pp. 43–47; Yogyo-Kyokai-Shi, 93 [7] 1985).

Various prior art references (Yogyo-Kyokai-Shi 91 [7] 1983, pp. 344–346; Yogyo-Kyokai-Shi 91 [2] 1983, pp. 81–86) disclose spray pyrolysis-based methods for forming hollow agglomerates of $MgAl_2O_4$. In the disclosed processes methanol-water mixtures are used to dissolve the metal nitrate precursors employed.

In Funtai Oyobi Funmatsu Yakin, Vol. 18 (1972) 280–283, solutions of metal nitrates in ethanol are used to make fine powders of NiO and $CoFe_2O_4$ by spraying the solution and igniting the resulting spray.

The prior art also discloses the use of $NH_4Cl$ and poly (vinyl alcohol) as additives in nitrate solutions to synthesize $LaCoO_3$ and $NaAlSiO_4$ by preparation of fine droplets, drying, and thermal decomposition (Journal of Material Science, 20 (1985) 1823–1827; Report of the Research Laboratory of Engineering Materials, Tokyo Institute of Technology, No. 9 (1984) pp. 66–73; Nippon Kagai Kaishi, Vol. 6 (1984) pp. 851–855). The effect of the additives on the surface area is investigated.

In Advances in Ceramics, Vol. 21 (1987), pp. 99–108, the enhancement in ceramic powder crystallinity and surface area as a function of polyethylene glycol and poly(vinyl alcohol) additives is disclosed. Solutions of various metal nitrates, metal acetates, and metal alkoxides are used as precursors in thermal reactions of atomized solutions (TRAS) to produce metal oxides by decomposition, hydrolysis or pyrolysis. The hydrolysis of $TiCl_4$ to $TiO_2$ is mentioned.

In J. Appl. Phys., 67 (9) pp. 4367–4369 (1990) and Journal of Alloys and Compounds, 187 (1992) pp.193–205, $YBa_2Cu_3O_{7-x}$, thin films are prepared from respective aqueous nitrate solutions containing ethanol via spray pyrolysis. The purpose or effect of ethanol on the process or the film morphology is not discussed, and no advantages with respect to the ethanol addition are disclosed. The references disclose the manufacture of thin films and not powders.

The prior art processes discussed here do not relate to or suggest the manufacture of pigment-grade titania material from titanium hydrolysate precipitate suspensions in liquids by a spray calcination process with or without using suitable fuels.

It is an object of the present invention to provide a method based on spray calcination of suspensions of insoluble, colloidal titanium hydrolysate precipitate to produce $TiO_2$ pigment particles which method allows the synthesis of pigment-grade $TiO_2$ in a one-step process without the need for subsequent extensive wet or dry grinding of the powders produced, i.e., the pigment produced should have a much smaller aggregate size than pigments formed by conventional calcination.

SUMMARY OF THE INVENTION

The method of producing $TiO_2$ pigment particles according to the present invention is primarily characterized by:

suspending a $TiO_aX_b(OH)_c$-based precursor in a liquid to form a suspension;

spraying the suspension to form droplets;

transporting the droplets into a flow reactor with a carrier gas;

decomposing the droplets in the flow reactor at high temperatures to form $TiO_2$ pigment particles.

$TiO_aX_b(OH)_c$ is a general formula representing the different constituents that make up titanium hydrolysate, for example, the precipitate of the sulfuric acid-based ore treatment $TiO_a(SO_4)_b(OH)_c$. Unlike common metal precursors such as nitrates, in case of titanium, the hydrolysate precursor employed in this invention has several important features. It is a precipitate insoluble in water and organic solvents, the size of the precipitate particles is between a few nanometer up to ~100 nm depending on the precipitation chemistry, and as the invention describes, droplets/particles of a colloidal suspension of titanium hydrolysate precursor can undergo desirable reactions in a flow reactor to from pigment quality titanium dioxide either without or preferably with the fuel additives in the suspension.

Preferably, X is $SO_4$, Cl or Br.

For b=0 $TiO_a X_b(OH)_c$ becomes $TiO_a(OH)_c$. $TiO_a(OH)_c$ is preferably produced by hydrolyzing titanium alkoxides, but it can also be amorphous colloidal titania. $TiO_a(OH)_c$ may also be prepared from $TiO_a(SO_4)_b(OH)_c$ by neutralization with subsequent filtration and washing. Such a feed material minimizes the formation of acidic gases during the calcination process.

Expediently, the method further comprises the step of adding to the suspension at least one doping compound for producing doped $TiO_2$. The doping compound contains preferably one or more elements selected from the group consisting of Al, Si, Zn, Sb, Zr, K, P, Na, Cs. Most preferred, the doping compound is potassium hydroxide and/or potassium carbonate. It may also be expedient to use phosphoric acid as a doping compound.

The liquid for preparing the suspension may be water. In a preferred embodiment of the present invention, a fuel is added to the liquid. The fuel is advantageously selected from the group consisting of methanol, ethanol, toluene, urea, and sugar mixtures. However, any combustible fuel, or combination of fuels, which upon combustion will not leave behind a residue that may hinder the properties or performance of the produced pigment is suitable. The fuel is inventively combusted within the flow reactor for generating the high temperatures required for decomposing the titanium precursor.

The liquid for producing the suspension may be methanol, ethanol or toluene, in which case no additional fuel is needed.

The carrier gas is preferably air, but can also be oxygen or a mixture of oxygen with an inert gas such as nitrogen or argon etc.

In a preferred embodiment of the present invention, a fuel is introduced into the flow reactor for combustion therein and generating the required high temperatures. Again, any combustible fuel, or combination of fuels, which upon combustion will not leave behind a residue that may hinder the properties or performance of the produced pigment is suitable for this purpose.

In yet another embodiment of the present invention, a superheated gas is introduced into the flow reactor for heating the droplets and the carrier gas to the required high temperatures.

Preferably, the method further comprises the step of collecting the $TiO_2$ pigment particles downstream of the flow reactor.

BRIEF DESCRIPTION OF THE DRAWING

The object and advantages of the present invention will appear more clearly from the following specification in conjunction with the accompanying only drawing FIG. 1 which shows schematically the inventive apparatus for the formation of pigment-grade $TiO_2$ particles.

DESCRIPTION OF PREFERRED EMBODIMENTS

The present invention will now be described in detail with the aid of several specific embodiments utilizing the only FIG. 1.

The system for performing the inventive method consists of the following components: a suspension droplet generator, a flow reactor to pass the suspension droplets through, and a particle-collection set-up for collecting the powder product. It is obvious to those skilled in the art that various types of droplet generators, respectively, spraying configurations such as atomizers, spray nozzles, nebulizers, ultrasonic aerosol generators, etc. can be used. Of course, different types of carrier gases (compressed air, oxygen, nitrogen, etc. and mixtures thereof) can be employed. Furthermore, the suspension can contain a compound of a dopant element dissolved in the liquid or suspended with the precipitate in the liquid. The invention is not limited with respect to the type of dopant material or the level of dopant material that can be employed.

The preferred titanium precursor for the inventive method is titanium hydrolysate precipitate, represented by the general formula $TiO_a(SO_4)_b(OH)_c$ (or simply: $TiOSO_4$). This material is synthesized by grinding a suitable ore (e.g., ilmenite) and digesting the ground ore with sulfuric acid. Typically, a porous cake containing sulfates of titanium, iron and other metals is obtained. This cake is then dissolved in water and the solution is reduced, if necessary, to make sure that all of the iron present in the solution is in the ferrous state. The solution is then filtered or otherwise clarified to remove insolubles. Excess iron may be removed by crystallization. The clarified and crystallized liquor is concentrated by evaporation under vacuum. Nuclei seeds of colloidal anatase or rutile are added to the concentrated liquor which is heated and diluted with water to cause hydrolysis of the titanium species. The hydrolysis results in precipitation of polymeric species composed of hydrous titanium oxide and titanium sulfates, hence the general formula $TiO_a(SO_4)_b(OH)_c$. The precipitate is then filtered and washed with water to remove metal impurities and excess sulfuric acid. The resulting washed precipitate is the preferred titanium precursor for the method of the present invention. As this invention describes, this precipitate is insoluble, has particles in the colloidal size range and is capable of forming pigment-grade $TiO_2$ via a suitable spray calcination process.

Other titanium precursors are, for example, chloride or bromide containing precipitates that are conventionally represented in short form as $TiOCl_2$ and $TiOBr_2$ (i.e., without the hydroxyl groups). Other possible precursors are produced by hydrolyzing titanium alkoxides, resulting in a compound that can be represented by the formula $TiO_a(OH)_c$ (wherein b=0 in the general formula $TiO_a(X)_b(OH)_c$). It is also possible to use amorphous colloidal titania which can be represented by the formula $TiO_a(OH)_c$.

The titanium precursor, preferably $TiO_a(SO_4)_b(OH)_c$, is suspended in a suitable liquid (for example, ethanol, water, water-ethanol or water-fuel mixtures). The suspension is sprayed with a suitable spraying assembly (droplet generator) into the flow reactor using a carrier gas such as air. It is well known to persons skilled in the art that other gases, such as oxygen or oxygen mixtures with inert gases, can also be used instead of air.

The droplets generated by the generator are carried by the carrier gas through the flow reactor. The flow reactor can be heated externally (e.g., by an electric furnace) or internally (by introducing a superheated gas or by combusting a fuel in the flow reactor). When ethanol or any other fuel is used as an additive to the liquid, the ethanol or fuel within the droplets is combusted as the droplets enter the hot-zone of the reactor. Finely dispersed dry particles of the precipitate precursor result. When only water is used as the liquid in the suspension, the droplets dry without exploding and relatively larger dry particles of Ti-hydrolysate precursor are formed. As these dried particles pass through the hot-zone of the reactor, the dried precursor, $TiO_a(SO_4)_b(OH)_c$, undergoes thermal decomposition within every particle resulting in the formation of $TiO_2$ particles. Reactor temperatures of 1000° to 1200° C. and 900° to 1200° C., respectively, are required to produce pigment-quality $TiO_2$ without and with fuel additives. These particles are collected in a particle collection set-up that is heated to prevent any condensation of the solvent. It is well known to persons skilled in the art that, depending on the rate of powder production, flow-rate, and temperature of the exiting gas-powder mixture, different powder collection arrangements can be used.

The pigment produced by this method has several advantages over pigments produced by conventional calcination. The method described in this invention utilizes much less energy to calcine the pigment because the heat transfer is much more effective when the gas stream is heated directly by combustion of fuel contained within the gas stream. Furthermore, much less milling is required to reduce the agglomerate size because the largest agglomerates cannot be any larger than the size corresponding to the mass in each individual droplet.

The invention can be carried out in a variety of configurations. Various methods can be used to generate the droplets using different well-known droplet generating set-ups. The tubular flow reactor can be used in a horizontal or vertical orientation. Different titanium precipitate precursors can be used, alone or in combination with other metal precursors to produce doped or composite particles. Dopant materials can be used alone or in combination, depending on the desired properties of the $TiO_2$ pigment particles. Preferred doping materials are, for example, potassium hydroxide, potassium carbonate, and phosphoric acid. The dopant materials can be added in amounts of 0.001 to 1.0 wt. % or more based on the $TiO_2$ contents of the precursor solution. It is well known to those skilled in the art that such additives (dopants) are often helpful in controlling the crystallite growth and crystal structure and hence the pigment properties of the product.

Depending on the precursor used, the reactor temperature and residence time can be chosen appropriately. Changes may be made in the design and operation of the components of the system, droplet generation and delivery, flow reactor, and powder collection disclosed herein without departing from the scope of the invention.

The required high temperatures within the flow reactor can be reached in various ways. Of course, it is possible to heat the flow reactor externally. But is also possible to heat the gas stream, i.e., the suspension droplets and the carrier gas, by combustion of fuel contained within the gas stream or within the droplets themselves using the oxygen of the carrier gas as the required oxygen source. Such a fuel, e.g., ethanol, methanol or other combustible materials, can be added to the liquid from which the suspension is prepared or such fuels can be used as the liquid itself. The energy released by the combustion within the flow reactor will heat the gas stream to the required decomposition temperature for the titanium precursor. Temperatures of 800° to 1150° C. can be easily reached. Instead of mixing the fuel into the solution, it is also possible to separately inject the fuel (liquid or gaseous) into the droplet generator. Another alternative is to introduce the fuel (liquid or gaseous) into the flow generator separate from the droplet flow. It is also possible to use so-called superheated gases resulting from the combustion of fuel/oxygen or fuel/air mixtures. Such superheated gases are at a temperature of above 800° C. Typically, fuels such as propane, butane, natural gas, gasoline, or other petroleum distillates can be used for all of the above described combustion processes. By varying the amount of fuel and by selecting a specific fuel or fuel mixture the temperature resulting in the flow reactor can be adjusted as desired.

The internal heating of the flow reactor has the advantage that the heat energy is directly transferred to the gas stream (comprised of the droplets and the carrier gas). No heat or energy loss occurs, which, in general, is observed when externally heating a device because heat losses result from passing through walls and dead spaces.

Example 1

Formation of Pigment-Grade $TiO_2$ Using Ethanol as a Fuel

Titanium hydrolysate precipitate, $TiO_a(SO_4)_b(OH)_c$, was suspended in pure ethanol to give a solution concentration of 10 wt. %. The suspension was sprayed, by using a BGI Collison nebulizer and compressed air (35 psi) as a carrier gas, into a tubular flow reactor heated to 800°–1200° C. The flow rate was 9.3 lpm and residence time ranged between 10.6 to 8 s.

As the droplets entered the tubular reactor, solvent evaporation started and ethanol acted as a fuel to blow the drying particles apart. As the blown-up particles of $TiO_a(SO_4)_b(OH)_c$ passed through the reactor, they decomposed due to the high temperature and formed $TiO_2$. Pigment-quality $TiO_2$ was produced over a temperature range of 900° to 1200° C. The $TiO_2$ particles produced were collected on a nylon filter kept at about 65° C. The conversion rate was 100%.

The particles were crystalline anatase phase of $TiO_2$ when studied by X-ray diffraction. Scanning and transmission electron microscopy indicated that the particles were agglomerates in the approximate size range 200 to 700 nm and were composed of primary particles in the size range 150 to 250 nm. The particles could be easily broken down into primary particles by soft grinding using a mortar and pestle.

Example 2

Formation of Pigment-Grade $TiO_2$ Using Water as the Solvent

Titanium hydrolysate precipitate, $TiO_a(SO_b)_y(OH)_c$, was suspended in water to give a solution concentration of 10 wt. %. The suspension was sprayed, by using a BGI Collison nebulizer and compressed air (35 psi) as a carrier gas, into a tubular flow reactor heated to 800°–1200° C. The flow rate was 9.3 lpm and residence time ranged between 10.6 to 8 s.

As the droplets entered the tubular reactor, evaporation of the solvent occurred resulting in dried particles of $TiO_x(SO_4)_y(OH)_z$. As the dried particles passed through the reactor, they decomposed due to the high temperature and formed $TiO_2$. Pigment-quality $TiO_2$ was obtained over the temperature range of 1000° to 1200° C. The $TiO_2$ particles produced were collected on a nylon filter kept at about 65° C. The conversion rate was 100%.

The particles were crystalline anatase phase of $TiO_2$ when studied by X-ray diffraction. Scanning and transmission electron microscopy indicated that the particles were agglomerates in the approximate size range 500 to 1200 nm and were composed of primary particles in the size range 175 to 225 nm.

Example 3
Formation of Pigment-Grade $TiO_2$ Using Water/Ethanol Mixture as the Solvent The precipitate of Ti-hydrolysate, $TiO_x(SO_4)_y(OH)_z$, was suspended in a 50/50 vol. % mixture of water and ethanol to give a solution concentration of 10 wt. %. The suspension was sprayed, by using a BGI Collison nebulizer and compressed air (35 psi) as a carrier gas, into a tubular flow reactor heated to 800°–1200° C. The flow rate was 9.3 Ipm and residence time ranged between 10.6 to 8 s.

As the droplets entered the tubular reactor, evaporation of the solvent occurred and ethanol acted as a fuel to blow the drying particles apart resulting in dried particles of $TiO_x(SO_4)_y(OH)_z$. As the dried particles passed through the reactor, they reacted due to the high temperature and formed $TiO_2$. Pigment-quality $TiO_2$ can be formed for reactor temperatures of 900° to 1200° C. The $TiO_2$ particles produced were collected on a nylon filter kept at about 65° C. The conversion rate was 100%.

According to X-ray diffraction studies the particles were crystalline anatase phase of $TiO_2$. Scanning and transmission electron microscopy indicated that the particles were agglomerates in the approximate size range 200 to 700 nm and were composed of primary particles in the size range 150 to 250 nm.

Example 4

Formation of Pigment-Grade Doped-$TiO_2$ Using Pure Water, Water-Ethanol Mixtures or Pure Ethanol as Solvents The process of Examples 1, 2, and 3 was used, except that the precipitate of Ti-hydrolysate, $TiO_a(SO_4)_b(OH)_c$, used in the suspension was doped with small amounts (0.001 to 0.1 wt. %) of one or more of the following compounds: phosphoric acid, potassium hydroxide, and potassium carbonate. Pigment-quality $TiO_2$ was produced at 1000° to 1200° C. using pure water and at 900° to 1200° C. using a 50/50 volume % mixture of water/ethanol or pure ethanol. The resultant particles were crystalline anatase phase of $TiO_2$ when studied by X-ray diffraction. Scanning and transmission electron microscopy indicated that the primary particles were in the size range of 175 to 225 nm.

Example 5

Formation of Pigment-Grade $TiO_2$ Using Solid Fuel in the Form of Sugar or Urea The precipitate of Ti-hydrolysate, $TiO_x(SO_4)_y(OH)_x$, was suspended in a solution of water and sugar, respectively, water and urea. The suspension was sprayed, by using a BGI Collison nebulizer and compressed air (35 psi) as a carrier gas, into a tubular flow reactor heated at 800°–1200° C. The flow rate was 9.3 Ipm and residence time ranged between 10.6 to 8 s.

As the droplets entered the tubular reactor, evaporation of water was complete in a short time. As the temperature of the dried $TiO_x(SO_4)_y(OH)_z$ particles started to increase, the solid fuel (sugar or urea) combusted and caused the particles to blow apart. As the dried particles passed through the reactor, they reacted due to the high temperature and formed $TiO_2$. Pigment-quality $TiO_2$ was produced at 900° to 1200° C. The $TiO_2$ particles produced were collected on a nylon filter kept at about 65° C. The conversion rate was 100%.

According to X-ray diffraction studies the particles were crystalline anatase phase of $TiO_2$. Scanning and transmission electron microscopy indicated that the particles were agglomerates in the approximate size range 200 to 600 nm and were composed of primary particles in the size range 150 to 250 nm. The particles could be easily broken down into primary particles by soft grinding with a mortar and pestle.

Example 6

Formation of Pigment-Grade $TiO_2$ Using a Commercially Available Spray Nozzle Generating Droplets of up to 50 $\mu$m Diameter and Water or Water-Sugar Solution as the Solvent The precipitate of Ti-hydrolysate, $TiO_x(SO_4)_y(OH)_z$, was suspended in water or a 1 wt.-% solution of sugar in water to give a 10 wt.-% solution of the Ti-hydrolysate. The suspension was sprayed, by using a commercially available spray nozzle (¼ J SS, Spray Systems, Inc.) and compressed air (40 psi) as a carrier gas, into a tubular flow reactor heated at 1100°–1150° C. The flow rate was 14 Ipm and residence time ranged between 8 to 6 s. The $TiO_2$ particles produced were collected on a nylon filter kept at about 65° C.

As the droplets entered the tubular reactor, evaporation of water occurred resulting in dry $TiOSO_4$ particles. As the dried particles passed through the reactor, they reacted due to the high temperature and formed $TiO_2$. When sugar was present in the solution, the combustion of sugar in the dried particles resulted in breaking the particles apart.

According to X-ray diffraction studies the particles were crystalline anatase phase of $TiO_2$. Scanning and transmission electron microscopy indicated that the particles were agglomerates in the approximate size range 200 nm to 3 $\mu$m with a small fraction of particles having a size of up to 20 $\mu$m. They were composed of primary particles in the size range 175 to 225 nm. The particles could be easily broken down into primary particles by light milling.

The present invention is, of course, in no way restricted to the specific disclosure of the specification, examples and drawings, but also encompasses any modifications within the scope of the appended claims.

What we claim is:

1. A method of producing $TiO_2$ pigment particles; said method comprising the steps of:

suspending a titanium hydrolysate precursor in a liquid to form a suspension, wherein the titanium hydrolysate precursor is selected from the group consisting of $TiOCl_2$, $TiOBr_2$, $TiOSO_4$, hydrolyzed titanium alkoxides, and amorphous colloidal titania;

spraying said suspension to form droplets;

transporting said droplets into a flow reactor with a carrier gas;

decomposing said droplets in the flow reactor at high temperatures to form $TiO_2$ pigment particles having a primary particle size of 150 to 250 nm.

2. A method according to claim 1, further comprising the step of adding to said suspension at least one doping compound for producing a doped $TiO_2$.

3. A method according to claim 1, wherein said doping compound contains at least one element selected from the group consisting of Al, Si, Zn, Sb, Zr, K, P, Na, Cs.

4. A method according to claim 3, wherein said doping compound is selected from the group consisting of potassium hydroxide and potassium carbonate.

5. A method according to claim 3, wherein said doping compound is phosphoric acid.

6. A method according to claim 1, wherein said liquid is water.

7. A method according to claim 6, further comprising the step of adding a fuel to said liquid.

8. A method according to claim 7, wherein said fuel is selected from the group consisting of methanol, ethanol, toluene, urea, and sugar mixtures.

9. A method according to claim 7, further comprising the step of combusting said fuel within the flow reactor for generating said high temperatures.

10. A method according to claim 1, wherein said liquid is selected from the group consisting of methanol, ethanol, and toluene.

11. A method according to claim 1, wherein the carrier gas is selected from the group consisting of air, oxygen, and a mixture of oxygen with an inert gas.

12. A method according to claim 1, further comprising the step of introducing a fuel into the flow reactor for combustion therein and generating said high temperatures.

13. A method according to claim 1, further comprising the step of introducing superheated gas into the flow reactor for heating said droplets and said carrier gas to said high temperatures.

14. A method according to claim 1, further comprising the step of collecting the $TiO_2$ pigment particles downstream of the flow reactor.

* * * * *